(12) United States Patent
Moorlag et al.

(10) Patent No.: US 7,767,758 B2
(45) Date of Patent: *Aug. 3, 2010

(54) SILANE FUNCTIONALIZED FLUOROPOLYMERS

(75) Inventors: Carolyn Patricia Moorlag, Mississauga (CA); Nan-Xing Hu, Oakville (CA); Yu Qi, Oakville (CA); Kathy Lynn De Jong, Oakville (CA)

(73) Assignee: Xerox Corporation, Norwalk, CT (US)

( * ) Notice: Subject to any disclaimer, the term of this patent is extended or adjusted under 35 U.S.C. 154(b) by 568 days.

This patent is subject to a terminal disclaimer.

(21) Appl. No.: 11/680,389

(22) Filed: Feb. 28, 2007

(65) Prior Publication Data

US 2008/0205950 A1 Aug. 28, 2008

(51) Int. Cl.
*C08L 27/00* (2006.01)
(52) U.S. Cl. ....................... 525/104; 528/401
(58) Field of Classification Search ................. 525/104
See application file for complete search history.

(56) References Cited

U.S. PATENT DOCUMENTS

| | | | |
|---|---|---|---|
| 4,777,087 A | 10/1988 | Heeks et al. | |
| 4,853,737 A | 8/1989 | Hartley et al. | |
| 5,166,031 A | 11/1992 | Badesha et al. | |
| 5,281,506 A | 1/1994 | Badesha et al. | |
| 5,456,987 A | 10/1995 | Badesha | |
| 5,501,881 A | 3/1996 | Fuller et al. | |
| 5,512,409 A | 4/1996 | Henry et al. | |
| 5,700,568 A | 12/1997 | Badesha et al. | |
| 5,729,813 A | 3/1998 | Eddy et al. | |
| 5,945,223 A | 8/1999 | Kuntz et al. | |
| 6,361,829 B1 | 3/2002 | Chen et al. | |
| 6,678,495 B1 | 1/2004 | Badesha et al. | |
| 6,680,095 B2 | 1/2004 | Gervasi et al. | |
| 6,733,839 B2 | 5/2004 | Badesha et al. | |
| 6,951,667 B2 | 10/2005 | Badesha et al. | |
| 7,074,488 B2 | 7/2006 | Pickering et al. | |
| 7,127,205 B2 | 10/2006 | Gervasi et al. | |
| 7,374,812 B2 * | 5/2008 | Mizuno | 428/212 |
| 2005/0277740 A1 * | 12/2005 | Paglia et al. | 525/326.2 |
| 2008/0213491 A1 * | 9/2008 | Moorlag et al. | 427/387 |

OTHER PUBLICATIONS

"Chemical Information Profile for Bisphenol AF", Supporting Nomination for Toxicological Evaluation by the National Toxicology Program, Sep. 2008.*

Baradie, Bilal, et al, "Novel Fluoro-Terpolymers for Coatings Applications", Macromolecules, Nov. 13, 2005, 5560-5558, vol. 38, Department of Chemical Engineering and Applied Chemistry, University of Toronto, Toronto, Ontario, Canada.

* cited by examiner

*Primary Examiner*—Randy Gulakowski
*Assistant Examiner*—Lindsay Nelson
(74) *Attorney, Agent, or Firm*—Pepper Hamilton LLP

(57) ABSTRACT

A composition of matter includes a plurality of fluoropolymer chains. Each of the fluoropolymer chains is chemically bonded to at least one organic graft. The at least one organic graft includes a phenoxy group, a linking group, and at least one silane end group. The phenoxy group is chemically bonded to the fluoropolymer chain, and the linking group chemically bonds the phenoxy group with the at least one silane end group.

18 Claims, 5 Drawing Sheets

SILANE FUNCTIONALIZED FLUOROPOLYMERS

CROSS-REFERENCE TO RELATED APPLICATIONS

This application is related to co-pending U.S. patent application Ser. No. 11/680,666.

STATEMENT REGARDING FEDERALLY SPONSORED RESEARCH

Not applicable.

NAMES OF PARTIES TO A JOINT RESEARCH AGREEMENT

Not applicable.

SEQUENCE LISTING

Not applicable.

BACKGROUND

1. Technical Field

The disclosed embodiments generally relate to the Held of fluoropolymers, and to the preparation and use of silane-functionalized fluoropolymers. The silane functionalized fluoropolymer provides a novel means of crosslinking fluoropolymers and adhering fluoropolymers to substrates. In particular, this disclosure relates to silane-functionalized coatings as those that may be useful for applying a top layer coating onto a fuser roil used in printing and copying operations.

2. Description of the Related Art

In a typical electrostatographic printing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be a photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures, particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of the fuser roll, and accordingly it is desired to provide a fusing surface, which has a low surfaced energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

One the earliest and successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks, which is incorporated herein in its entirety.

While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

Fuser and Fixing rolls may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety.

U.S. Pat. No. 7,127,205, which is incorporated in its entirety herein, provides a process for providing an elastomer surface on a fusing system member. Generally, the process includes forming a solvent solution/dispersion by mixing a fluoroelastomer dissolved in a solvent such as methyl ethyl ketone and methyl isobutyl ketone, a dehydrofluorinating agent such as a base, for example the basic metal oxides, MgO and/or $Ca(OH)_2$, and a nucleophilic curing agent such as VC-50 which incorporates an accelerator and a crosslinking agent, and coating the solvent solution/dispersion onto the substrate. Commonly used fluoropolymer crosslinkers are bisphenol-A and bisphenol AF that are known to react with unsaturated positions on fluoropolymer chains. The surface is then stepwise heat cured. Prior to the stepwise heat curing, ball milling is usually performed for from 2 to 24 hours.

Current fuser rolls may be composed of reinforced silicone with a crosslinked fluoropolymer as the top layer. These rolls fail at shorter times than desirable, primarily due to edge wear and poor release at the surface (offset). Fluoropolymer can withstand high temperature (>200°) and pressure conditions and exhibit chemical stability and low surface energy, i.e. release properties.

A more mechanically robust coating is required for new generation fusing systems in order to improve lifetime and diminish the occurrence of roll failure due to edge wear. Higher thermal conductivity of the top layer would improve heat retention at the surface during fusing, and electrical conductivity would dissipate any static charge buildup.

Fluoropolymer is conventionally cured by peroxides, amines, or phenols. When using peroxides a special cure site monomer is required, and peroxide curing is not preferred for fuser members. Amine curing was an early method to cure fluoropolymer. However, amine cured fluoropolymer shows susceptibility to moisture and hydrolysis. Curing with phenols results in hydrolytically stable fluoroelasotomers, but requires the use of basic metal oxide particles to serve as dehydrofluorinating agents to neutralize the hydrofluoric acid that is released from the fluoropolymer during the curing reaction. Since these particles are present during the curing reaction, it is difficult to remove them from the cured fluoroelastomer. The presence of the metal oxide particles in a fuser outer coating layer can result in degradation of the fused image. Further, the particles may have a tendency to migrate or "bloom" to the surface of the coating on the fuser member, and further shorten the life of the fuser member. An alternative crosslinking approach for fluoropolymer could be used to modify the material properties. Improvements of mechanical properties such as wear or changing surface interactions to improve release would extend fuser roll life.

The disclosure contained herein describes attempts to address one or more of the problems described above.

SUMMARY

A composition of matter includes a plurality of fluoropolymer chains. Each of the fluoropolymer chains is chemically bonded to at least one organic graft. The at least one organic graft includes a phenoxy group, a linking group, and at least one silane end group. The phenoxy group is chemically bonded to the fluoropolymer chain, and the linking group chemically bonds the phenoxy group with the at least one silane end group.

In embodiments, each of the plurality of fluoropolymer chains may include a monomeric repeat unit that is selected from the group consisting of vinylidene fluoride, hexafluoropropylene, tetrafluoroethylene, perfluoro(methyl vinyl ether), and mixtures thereof.

In other embodiments, the linking group may be selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

In exemplary embodiments, the at least one silane end group may be a hydroxyl group or a hydrolytic group selected from the group consisting of alkoxy, halide, carboxylate, and mixtures thereof.

In some embodiments, the composition of matter may be substantially free of metal oxide particles.

In further embodiments, substantially all of the silane end groups are condensed into a plurality of siloxane crosslinking groups.

Yet other embodiments include a fluoroelastomer composition. A fluoroelastomer composition includes a network of fluoropolymer chains, and a plurality of organic grafts. Each of the plurality of organic grafts includes a reactive end group, a linking group, and at least one silane end group. The reactive end group is chemically bonded to one of the fluoropolymer chains of the network, the linking group chemically bonds the reactive end group with the at least one silane end group, and substantially all of the silane end groups are condensed into a plurality of siloxane crosslinking groups.

In some embodiments of a fluoroelastomer, the fluoropolymer chains may include a monomeric repeat unit that is selected from the group consisting of vinylidene fluoride, hexafluoropropylene, tetrafluoroethylene, perfluoro(methy) vinyl ether), and mixtures thereof.

In still more embodiments, the fluoroelastomer may include reactive end group that may be selected from the group consisting of phenol, amine, and mixtures thereof.

Further embodiments may include a the linking group that may be selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

A fluoroelastomer may include at least one silane end group that may be selected from the group consisting of silanol, hydrolytic, alkoxy, halide, carboxylate, and mixtures thereof.

In exemplary embodiments of a fluoroelastomer, the organic graft may be represented by the formula $[HO]_j A—[L-Si(R)_{3-m}Y_m]_k$ in which A is an aromatic group or a fluorinated aromatic group having from about 6 to about 30 carbons, L is a divalent linkage group, R is a hydrogen atom, an alkyl group or an aryl group, Y is a hydroxyl group or a hydrolytic group selected from the group consisting of alkoxy, halide, carboxylate, and mixtures thereof, m is an integer of from 1 to 3, and i and k are each an integer independently selected from 1 to about 5.

Other embodiments include a coated fuser member. A coated fuser member includes a fuser member, and a fluoroelastomer coating on the fuser member. The fluoroelastomer coating comprises a network of fluoropolymer chains, and a plurality of organic grafts. Each of the plurality of organic grafts includes a reactive end group, a linking group, and at least one silane end group. The reactive end group is chemically bonded to one of the fluoropolymer chains of the network, wherein the linking group chemically bonds the reactive end group with the at least one silane end group, and substantially all of the silane end groups are condensed into a plurality of siloxane crosslinking groups.

In embodiments of a coated fuser member, the fluoropolymer chains may include a monomeric repeat unit that is selected from the group consisting of vinylidene fluoride, hexafluoropropylene, tetrafluoroethylene, perfluoro(methyl vinyl ether), and mixtures thereof.

In exemplary embodiments the reactive end group may be selected from the group consisting of phenol, amine, and mixtures thereof.

In still more embodiments, a coated fuser member may include a linking group that is selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

In other embodiments, a coated fuser member may include at least one silane end group that may a hydroxyl group or a hydrolytic group selected from the group consisting of alkoxy, halide, carboxylate, and mixtures thereof.

Embodiments include, a coated fuser member that further includes a material that may be selected from the group consisting of a polymer, a metal, a metal oxide, and a ceramic.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Embodiments herein describe a new silane functionalized fluoropolymer material where fluoropolymer chains are grafted with silane terminated organic chains via a reactive end group. Also embodied herein are siloxane-cured fluoroelastomers resulting from a condensation reaction of the silane groups that are grafted to the polymer chains. A strongly networked system results from thermal curing of neat silane functionalized fluoropolymers and contains incorporated siloxane components. The hybrid fluoropolymer/siloxane material displays improved hardness and strength compared to fluoropolymer. The new elastomeric material could have a variety of applications as resilient, non-stick coatings on different substrates. Siloxane functionalized fluoroelastomer could be used in fusing applications as a highly crosslinked fluoropolymer top coating, such as the fluoropolymer sold under the trade name VITON®, where the introduction of siloxane groups may improve the interaction with polydimethylsiloxane-based released fluid, or to bond to other components of the fuser roll system, such as to reinforcing fillers or the silicone substrate.

A silane functionalized fluoropolymer may include fluoropolymer chains grafted with silane-terminated organic chains. The organic chains are grafted to fluoropolymer via the use of a multifunctional silane crosslinker that contains a reactive group including phenols, amines or others, and at least one silane end group.

Figure 1:
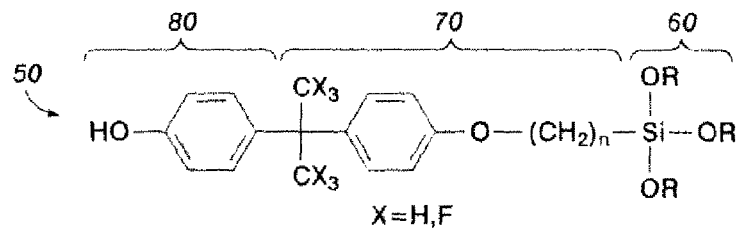
FIG. 1 depicts an embodiment of a silane crosslinker (or graft).

An embodiment of a silane crosslinker or organic graft 50 is depicted in FIG. 1. The graft contains at least one silane functionalized end group 60, a linking group 70 and a reactive end group 80, which in the embodiment of FIG. 1 is a phenol group.

Figure 2:
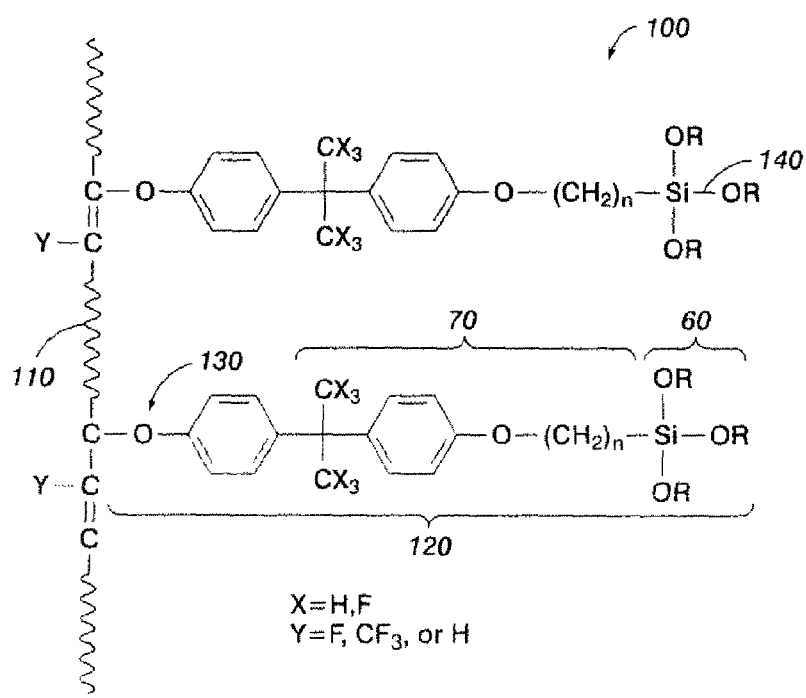
FIG. 2 depicts an embodiment of a silane grafted (or functionalized) fluoropolymer.

In FIG. 2 a silane grafted (or functionalized) fluoropolymer 100 composition of matter includes a plurality of fluoropolymer chains 110 (only one is shown) that include at least one organic graft 120. In an embodiment the at least one organic graft 120 includes a phenoxy group 130, a linking group 70, and at least one silane end group 60. The phenoxy group 130 is chemically bonded to a fluoropolymer chain 110. The linking group 70 chemically bonds the phenoxy group 130 with the at least one silane end group 60.

The fluoropolymer may be among others, one such as the one sold under the trade name VITON-GF® (E. I. du Pont de Nemours, Inc.), which is made of tetrafluoroethylene (TFE), hexafluoropropylene (HFP), vinylidene fluoride (VF2), and a brominated peroxide cure site. In embodiments, the fluoropolymer chains 110 may include a monomeric repeat unit that is selected from the group consisting of vinylidene fluoride, hexafluoropropylene, tetrafluoroethylene, perfluoro(m- ethyl vinyl ether), and mixtures thereof. In another embodiment, the fluoropolymer 110 is comprised of a poly (vinylidene fluoride), or a copolymer of vinylidene fluoride with another monomer. For example, the fluoropolymer 110 is a copolymer of vinylidene fluoride with another monomer selected from the group consisting of hexafluoropropylene, tetrafluoroethyelene, and a mixture thereof.

The linking group 70 may be selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

In embodiments, the at least one silane end group 60 may include at least one hydrolytic 140 silane end group as depicted in FIG. 2. The at least one silane end group 60 may include up to three hydrolytic 140 silane end groups. The silane end groups may be branched at some point on the molecule so that there may be any plurality of silane end groups, all of which are encompassed in embodiments herein. In embodiments, the at least one silane end group 60 may be selected from the group consisting of silanol groups, hydroxyl groups, hydrolytic groups, alkoxy groups, halide groups, carboxylate groups, and mixtures thereof. A hydrolytic silane end group, as used herein, is a silane that when in the presence of moisture hydrolyzes to form a silanol end group. The at least one hydrolytic silane end group may be any hydrolytic silane end group known now or hereafter to one of ordinary skill in the art.

The silane functionalized fluoropolymer may be prepared in a manner that is analogous to procedures used to crosslink fluoropolymers. The procedure includes admixing the fluoropolymer, the silane graft, MgO particles, $Ca(OH)_2$ particles, CaO particles and a triphenylbenzylphosphonium accelerator into a solvent, with heating. The basic metal oxides facilitate the dehydrofluorination process in which hydrogen and fluorine atoms are removed from the polymer chain resulting in unsaturated positions on the chains. The phenol group, or the reactive end group, of the graft can add to the fluoropolymer chain at the unsaturated position resulting in a silane functionalized polymer chain.

Once the fluoropolymer is grafted, the solution can be filtered to remove metal oxide particles from the silane grafted fluoropolymer. Therefore, the silane grafted fluoropolymer is substantially free of metal oxide particles, which could detrimentally affect end-use properties such as for example those used as fuser roll coatings. Alternatively, in lieu of filtering the solution, the silane end groups could react with the metal particles during curing or evaporation of the solvent to fix the particles in place in a siloxane-cured fluoroelastomer fuser member coating.

The plurality of fluoropolymer chains on the silane grafted fluoropolymers may be crosslinked together by a condensation reaction of the silane end groups resulting in the formation of a siloxane bond between the silane end groups of the organic grafts. This results in a siloxane crosslinked fluoroelastomer that is substantially free of metal oxide particles.

Figure 3:
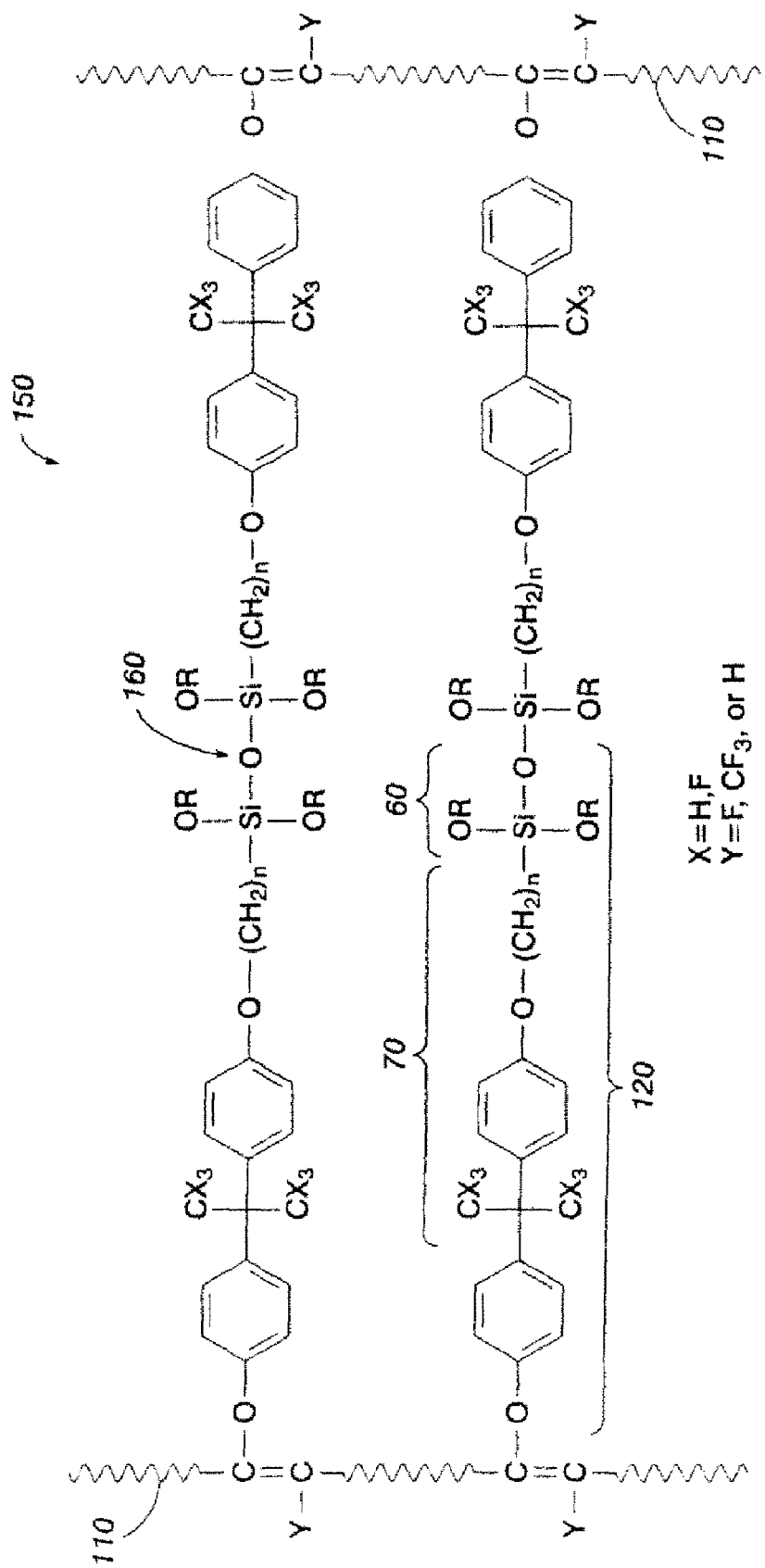
FIG. 3 depicts siloxane cross linked fluoroelastomer that results from the condensation of silane end groups of a silane functionalized fluoropolymer.

A siloxane crosslinked fluoroelastomer 150 that results from the condensation of silane end groups of a silane functionalized polymer is depicted in FIG. 3. A siloxane cross linked fluoroelastomer 150 includes a network of fluoropolymer chains 110. Organic grafts 120 are chemically reacted to the fluoropolymer chains. In an embodiment the organic grafts 120 are reacted to the fluoropolymer chain 110 through reactive end group 130, which in the embodiment of FIG. 3 includes a phenoxy group. However, it is realized that reactive end group of a siloxane crosslinked fluoroelastomer 150 may also include an amine, or any other functional groups that will react with the fluoropolymer chains of the network that are known now or hereafter to one of ordinary skill in the art. The organic graft further includes a linking group 70, and at least one silane end group 60. The linking group 70 chemically bonds the reactive end group 130 with the at least one silane end group 60.

In embodiments of fluoropolymers and fluoroelastomers herein, an organic graft may be represented by the formula:

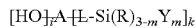

in which A is an aromatic group or a fluorinated aromatic group having from about 6 to about 30 carbons, L is a divalent linkage group, R is a hydrogen atom, an alkyl group or an aryl group, Y is a silane end group which may be a hydroxyl group or a hydrolytic group selected from the group consisting of alkoxy, halide, carboxylate, and mixtures thereof, m is an integer of from 1 to 3, and i and k are each an integer independently selected from 1 to about 5.

In embodiments, the A group may be selected from the group consisting of

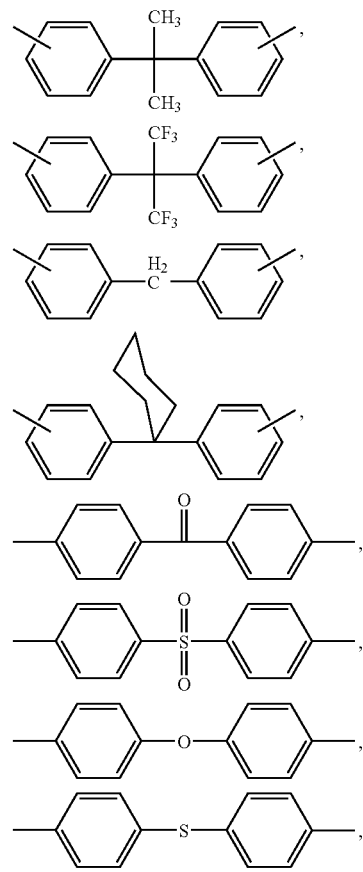

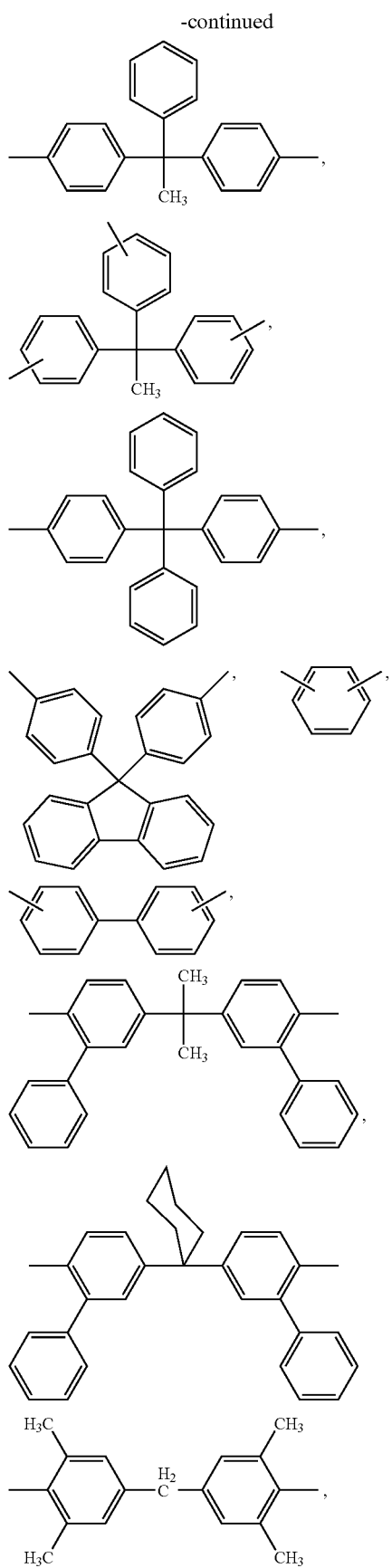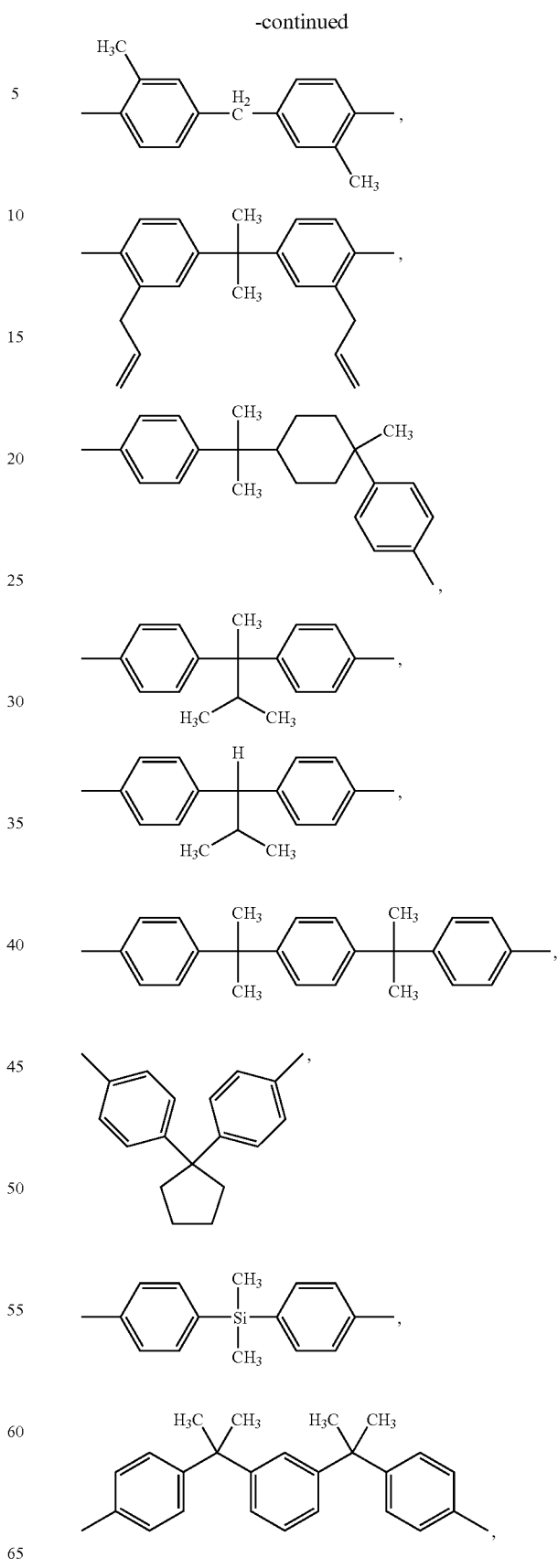
and the fluorinated derivatives thereof.

In further embodiments of fluoropolymers and fluoroelastomers herein, the linkage group L may be selected from the groups consisting of:

–(CH$_2$)$_y$–, wherein y is an integer of from 1 to about 10;

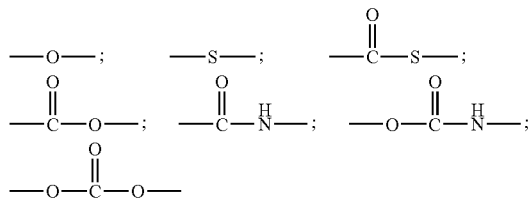

and combinations thereof.

In embodiments, the silane end groups 60 may be susceptible to hydrolysis. In these embodiments, for example, but not limited to, an alkoxy silane may be hydrolyzed by moisture from the atmosphere to a silanol. In embodiments, the silane end groups 60 may include hydroxyl-silanes, also referred to as silanols. The silanol groups then can condense to crosslink the silane grafted fluoropolymer chains, resulting in a fluoroelastomer 150 that is crosslinked via a plurality of siloxane groups 160. In embodiments, substantially all of the silane end groups may be condensed into a plurality of siloxane crosslinking groups. This condensation reaction may be depicted as follows:

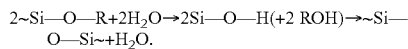

The siloxane crosslinked fluoroelastomer can form by coating the non-crosslinked silane functionalized fluoropolymer onto a substrate, allowing the solvent to evaporate, and heating the substrate to promote the condensation reaction and formation of the siloxane crosslinking bonds. Curing schedules known now or hereafter for curing fluoropolymers are encompassed in embodiments herein. Alternatively, curing temperatures and times for particular substrates and/or for particular degrees of crosslinking may be determined by one of ordinary skill in the art without undue experimentation. The siloxane crosslinked fluoroelastomer that is substantially free of metal oxide particles can be used as a fuser roll coating and have strong adhesion to a fuser roll silicone substrate and improved interaction with polysiloxane fuser roll oils. The siloxane crosslinked fluoroelastomer would be anticipated to have strong adhesion to a silica-containing glass or other silica-containing materials.

In embodiments of fluoropolymers and fluoroelastomers herein, the organic graft may be selected from the group consisting of:

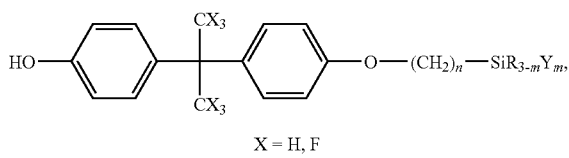

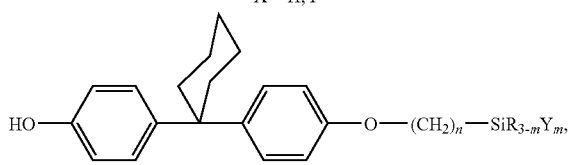

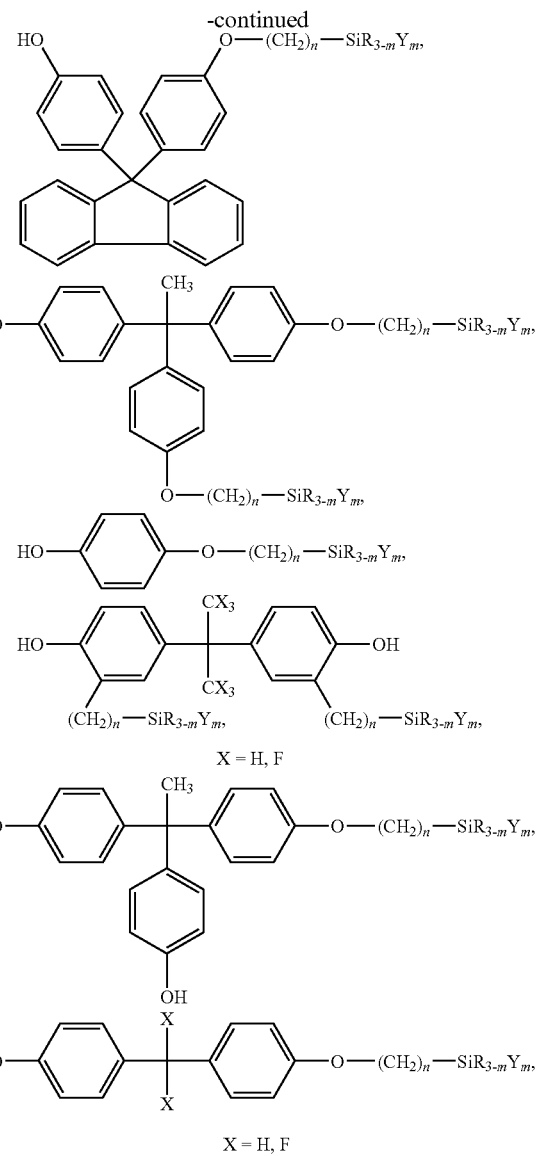

and the fluorinated derivatives thereof, wherein R is a hydrocarbyl group having from 1 to about 15 carbons, Y is a hydroxyl group or a hydrolytic group selected from the group consisting of alkoxy, halide, carboxylate, and mixtures thereof, n is an integer of from 1 to about 12, and m is an integer of from 1 to 3.

Figure 4:
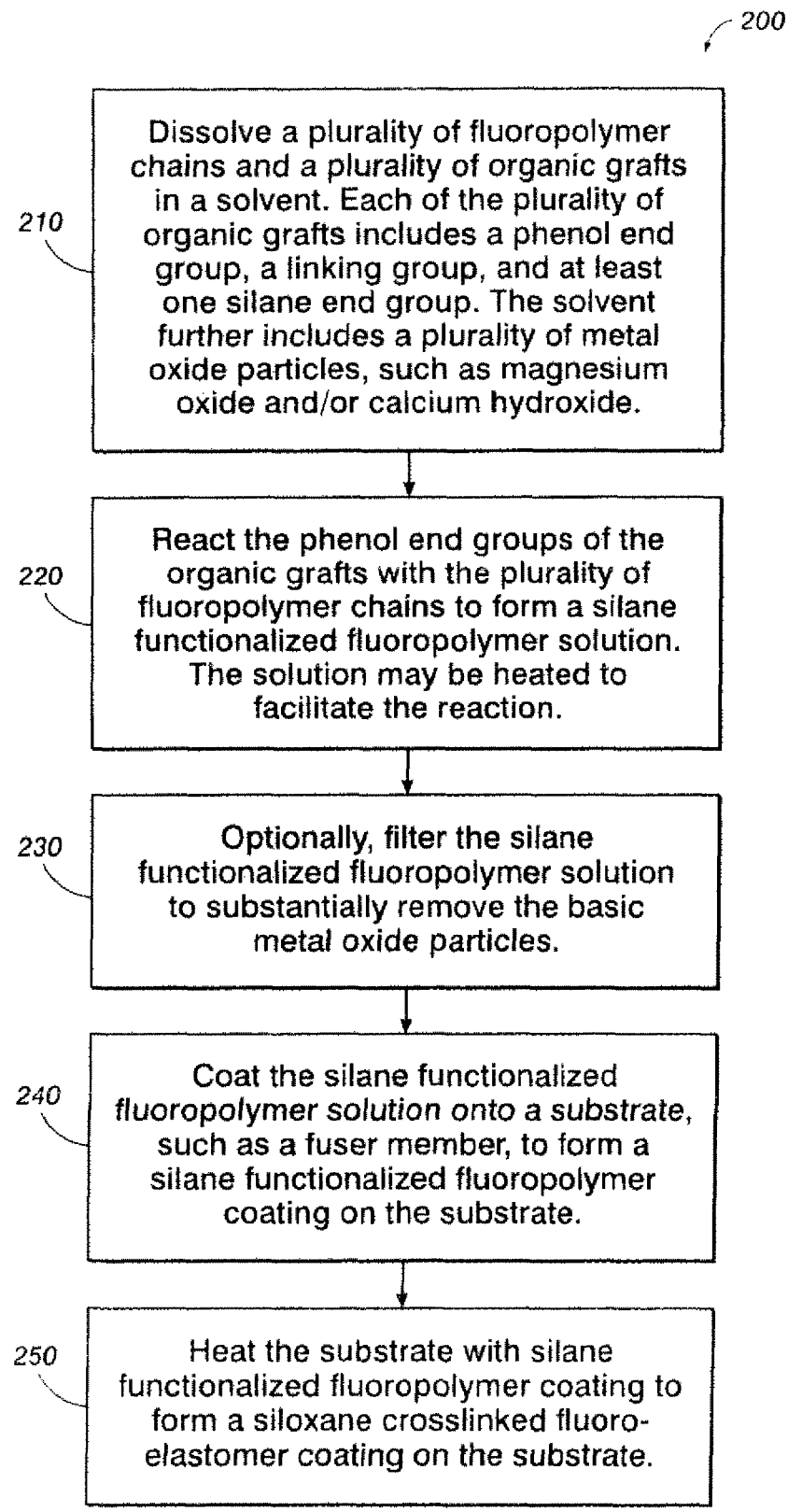
FIG. 4 depicts a flow diagram of an exemplary method to prepare a siloxane crosslinked fluoroelastomeric coating on a substrate such as a fuser member.

An exemplary method to prepare a siloxane crosslinked fluoroelastomeric coating on a substrate such as a fuser member 200 is depicted in FIG. 4. The method may include dissolving 210 a plurality of fluoropolymer chains and a plurality of organic grafts in a solvent, where each of the plurality of organic grafts includes a phenol end group, a linking group, and at least one silane end group. It is realized that the phenol end group is also referred to herein as a reactive end group, and for the embodiments of fluoroelastomers herein, reactive end groups may include amine and others that react with the fluoropolymer chain. The solvent further includes a plurality of metal oxide particles, such as magnesium oxide, calcium hydroxide, and/or mixtures thereof. A method includes reacting 220 the phenol end groups of the organic grafts with the plurality of fluoropolymer chains to form a silane functionalized fluoropolymer solution. In an embodiment, the solution may be heated for example at a reflux temperature of about 116° C. for about 20 hours to complete the grafting reaction. Embodiments may include reflux temperatures from about 80° C. to about 200° C. Other embodiments may include reflux temperatures from 100° C. to about 150° C. After the reaction, the silane functionalized fluoropolymer solution may optionally be filtered 230 to substantially remove the basic metal oxide particles. The silane functionalized fluoropolymer solution may be coated 240 onto a substrate, such as a fuser member, to form a silane functionalized fluoropolymer coating on the substrate. The substrate with the silane functionalized fluoropolymer coating may be heated 250 to form a siloxane crosslinked fluoroelastomer coating on the substrate. The coating may allow for evaporation of the solvent at ambient temperature. The curing temperature may range from about 100° C. to about 250° C., or from about 150° C. to about 200° C.

In another method embodiment to prepare a siloxane crosslinked fluoroelastomeric coating as described in FIG. 4, the grafting reaction 220 may be skipped, wherein the organic grafts react with the fluoropolymer during the curing stage 250.

In a method embodiment, the plurality of fluoropolymer chains may include a monomeric repeat unit that is selected from the group consisting of vinylidene fluoride, hexafluoropropylene, tetrafluoroethylene, perfluoro(methyl vinyl ether), and mixtures thereof, and the solvent may be selected from the group consisting of acetone, methyl isobutyl ketone, methyl ethyl ketone, and mixtures thereof.

In a further method embodiment, the linking group may be selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

In still a further embodiment, a method may include selecting an organic graft which has at least one hydrolytic silane end group. A hydrolytic silane end group, as used herein, is a silane end group that when in the presence of moisture hydrolyzes to form a silanol end group. Alternatively, the silane end group may be a silanol.

In still another embodiment, a fluoroelastomer includes a network of fluoropolymer chains. The network of chains may be crosslinked by a plurality of siloxane crosslinking groups. The siloxane crosslinking groups may be formed by the condensation of silane groups that are on the distal, or terminal end of organic grafts that are each grafted or chemically reacted with one of the fluoropolymer chains. Each graft contains a reactive end group, a linking group, and at least one silane end group. The reactive end group may include amine and phenol and others and mixtures thereof. The reactive end group is chemically bonded to one of the fluoropolymer chains of the network, typically through a dehydrofluorination reaction followed by addition to the unsaturated group on the fluoropolymer chain that is formed as a result of the dehydrofluorination. The linking group chemically bonds the reactive end group with the at least one silane end group, and substantially all of the silane end groups are condensed into a plurality of siloxane crosslinking groups to interconnect the network of fluoropolymer chains. The at least one silane end group may include a hydroxyl group or a hydrolytic group selected from the group consisting of alkoxy, halide, carboxylate, and mixtures thereof. The solution with the silane functionalized fluoropolymer may be filtered to substantially remove the metal oxide particles.

In still other embodiments, a method may include admixing a plurality of fluoropolymer chains and a plurality of organic grafts and an optional solvent. Each of the plurality of organic grafts includes a phenol end group, a linking group, and at least one silane end group. The phenol end groups of the organic grafts are reacted each with one of the plurality of fluoropolymer chains to form a silane functionalized fluoropolymer.

In an embodiment, each of the plurality of fluoropolymer chains may include a monomeric repeat unit that is selected from the group consisting of vinylidene fluoride, hexafluoropropylene, tetrafluoroethylene, perfluoro(methyl vinyl ether), and mixtures thereof.

In yet another embodiment, the reactive end group may be selected from phenol, amine, and mixtures thereof, and the linking group may be selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

In an embodiment, the at least one silane end group may include at least one silane end group that may be selected from the group consisting of a hydroxyl group or a hydrolytic group selected from the group consisting of alkoxy, halide, carboxylate, and mixtures thereof.

In another method embodiment, the optional solvent may be selected from the group consisting of acetone, methyl isobutyl ketone, methylethyl ketone, and mixtures thereof.

In other method embodiments, the basic metal oxide particles may be selected from magnesium oxide, calcium oxide, calcium hydroxide, and the like, and mixtures thereof. After the reacting step, a filtering step may be used to remove the metal oxide particles.

In embodiments, a method may further include coating the silane functionalized fluoropolymer onto a substrate. The silane functionalized fluoropolymer may be cured, and curing may be realized by heating.

In a method embodiment, the substrate may be selected from the group consisting of a fuser member, polymer substrates such as plastics, silicone polymers and the like, metals, metal oxides, silicone oxides, ceramics and the like.

A further method includes admixing a plurality of fluoropolymer chains, and a plurality of basic metal oxide particles, a plurality of organic grafts, and an optional solvent to form a polymer composition, wherein each of the plurality of organic grafts comprises a reactive end group, a linking group, and at least one silane end group. The composition may be cured. During curing, each of the reactive end groups of the plurality of organic grafts reacts with the plurality of fluoropolymer chains, and the silane end groups condense to form a siloxane crosslinked fluoroelastomer. Curing is realized by heating the polymer composition, but some degree of curing occurs when the solvent is evaporated at room temperature. Before curing, the polymer composition may be coated onto a substrate. Suitable substrates include a fuser member, a polymer, a metal, a metal oxide, a ceramic, a silicone, and a silicon dioxide glass.

The plurality of fluoropolymer chains may include a monomeric repeat unit that is selected from the group consisting of vinylidene fluoride, hexafluoropropylene, tetrafluoroethylene, perfluoro(methyl vinyl ether), and mixtures thereof. The reactive end groups may be selected from phenol, amine, and mixtures thereof.

In a method, the linking group may be selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

In method embodiments, the at least one silane end group may be a hydroxyl group or a hydrolytic group selected from the group consisting of alkoxy, halide, carboxylate, and mixtures thereof.

A substrate for a method herein may include a fuser member, a polymer, a metal, a metal oxide, and a ceramic.

A further embodiment includes coating a fuser member. In embodiments a fuser member is provided. A plurality of fluoropolymer chains and a plurality of organic grafts are dissolved in a solvent. The solvent further may further include a plurality of basic metal oxide particles. Each of the plurality of organic grafts may include a reactive end group, where the reactive end group is selected from the group consisting of phenol, amine, and mixtures thereof; a linking group; and at least one silane end group, where the silane end group may be a hydroxyl group or a hydrolytic group selected from the group consisting of alkoxy, halide, carboxylate, and mixtures thereof.

The reactive end groups of the organic grafts are reacted with the plurality of fluoropolymer chains to form a silane functionalized fluoropolymer solution.

The silane functionalized fluoropolymer solution is coated onto the fuser member to form a fluoropolymer coating, and the fluoropolymer coating is heated to form a siloxane crosslinked fluoroelastomer coating on the fuser member.

In embodiments the silane functionalized fluoropolymer solution may be filtered prior to coating the fuser member to substantially remove the particles from the silane functionalized fluoropolymer solution.

Heating the fluoropolymer coating may be a step curing cycle where the temperature and heating time at temperature are varied; these curing cycles for fluoroelastomers are known by persons of ordinary skill in the art.

Embodiments herein could be used in fusing applications as a highly crosslinked fluoropolymer top coating. The extent of crosslinking could be improved compared to conventionally crosslinked fluoropolymer due to the condensation of multiple alkoxy (and other hydrolytic silane) substituents. Silane groups can also bond to other components of the fuser roll system, such as to fillers, to the underlying silicone substrate, or to other incorporated materials. Covalent bonding of fluoropolymer via siloxane bonds to all components of the top coating improves the mechanical properties of the system. Siloxane bonding to the silicone substrate would improve adhesion to the silicone rubber surface of a fuser roll, and additionally prevent delamination. The siloxane crosslinking groups may improve the interaction of a polysiloxane release fluid with the coating to result in better release of toner particles at the fuser roll surface.

While the siloxane-cured fluoroelastomer serves as a coating for a fuser member, it is also anticipated to exhibit strong and durable adhesion to silica-containing glass and other silica containing materials to form a non-stick coating with excellent adhesion to the surface.

In another method embodiment, it is possible to precipitate the silane functionalized fluoropolymer before it is crosslinked, so that it can be stored and use at another time, or for another purpose. In an embodiment, a plurality of fluoropolymer chains and a plurality of organic grafts may be dissolved in a solvent. Each of the plurality of organic grafts may include a reactive end group, such as a phenol end group, a linking group, and at least one silane end group. The solvent may further include a plurality of metal oxide particles. In an embodiment, the solution is stirred and heated to react, the phenol end group of the organic grafts with the plurality of fluoropolymer chains to form a silane functionalized fluoropolymer dissolved in the solvent. The solvent with the silane functionalized fluoropolymer may be filtered to substantially remove the basic metal oxide particles. The silane functionalized fluoropolymer may be precipitated from the solvent. An exemplary method of precipitating the silane functionalized fluoropolymer may include adding the original solvent with the dissolved silane functionalized fluoropolymer dropwise into an excess of another liquid in which the silane functionalized fluoropolymer is not substantially soluble. Such a liquid includes, for example, isopropanol. Any un-reacted grafting materials or other impurities may be removed by successively washing the precipitate in excess volumes of isopropanol. The washed silane functionalized fluoropolymer may be dried.

After the silane functionalized fluoropolymer is dried, it may be redissolved into an effective solvent to form a high purity silane functionalized fluoropolymer solution. The high purity silane functionalized fluoropolymer solution may be coated onto a substrate, and substantially cured by heating the silane functionalized fluoropolymer coating on the substrate to form a siloxane crosslinked fluoroelastomer coating on the substrate. Thus the silane functionalized fluoropolymer may be stored as a powder. When a need for a coating or other purpose arises, the silane functionalized fluoropolymer may be redissolved in a solvent, coated onto a substrate, and cured on the substrate, such as a fuser member or silica-containing glass, to form a siloxane crosslinked fluoropolymer coating.

EXAMPLES

In one application, 2.0 parts of a fluoroelastomer sold under the trade name VITON-GF® were dissolved into 75 parts of methylisobutylketone (MIBK) over 18 hours at room temperature. Then, 0.031 part of MgO and 0.021 part of $Ca(OH)_2$ were mixed in 25 parts of MIBK, sonicated to disperse the oxides, and this mixture was added to the solution. 0.362 part of silane crosslinker, bisphenol-AF-propylmethyl-diisopropoxysilane (see FIG. 1, where X=F, N=3, R=CH($CH_3CH_2$), R'=$CH_3$), and 0.028 part of triphenylbenzylphosphonium chloride were subsequently added and the suspended mixture was stirred at reflux temperature for about 20 hours. The mixture was filtered to remove suspended oxide particles, and the filtrate was added dropwise into an excess of isopropanol to precipitate silane-grafted fluoropolymer. Excess silane crosslinker (un-reacted organic graft) and sideproducts were removed by successively washing with isopropanol and decanting the solution from the polymer. The fluoropolymer product precipitated from isopropanol was redissolved in MIBK and stored at an estimated solids loading of 17.5% (w/w).

Figure 5A:
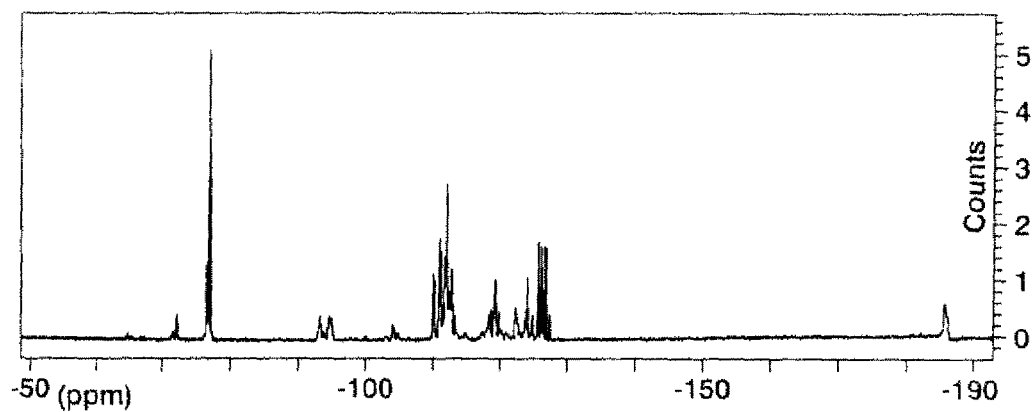
FIG. 5A is a nuclear magnetic resonance (NMR) spectrum of a neat fluoropolymer sold under the trade name VITON®.
Figure 5B:
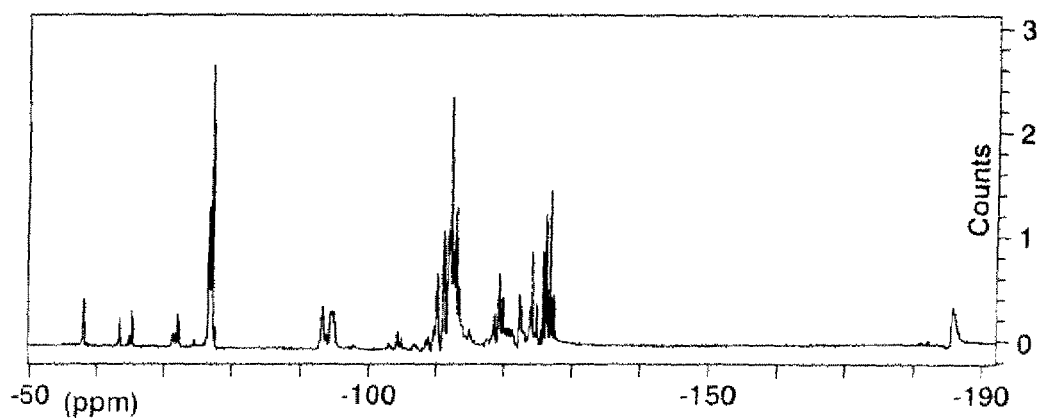
FIG. 5B is a nuclear magnetic resonance (NMR) spectrum of silane functionalized fluoropolymer, using the fluoropolymer sold under the trade name VITON®.

Characterization of the silane grafted fluoropolymer:

The $^{19}$F NMR (nuclear magnetic resonance) spectrum of the silane grafted fluoropolymer after removal of the MIBK under vacuum was recorded in acetone-D6. The NMR spectrum of such a sample is depicted in FIGS. 5A (fluoropolymer sold under the trade name VITON®) and 5B (silane functionalize fluoropolymer, using the fluoropolymer sold under the trade name VITON®). New peaks in the spectrum of FIG. 5B in the region of −55 to −65 ppm indicate the presence of —CF$_3$ groups of the silane crosslinker (organic graft). Other small peaks are observed that are likely due to the functionalization of the fluoropolymer chains.

Figure 6:
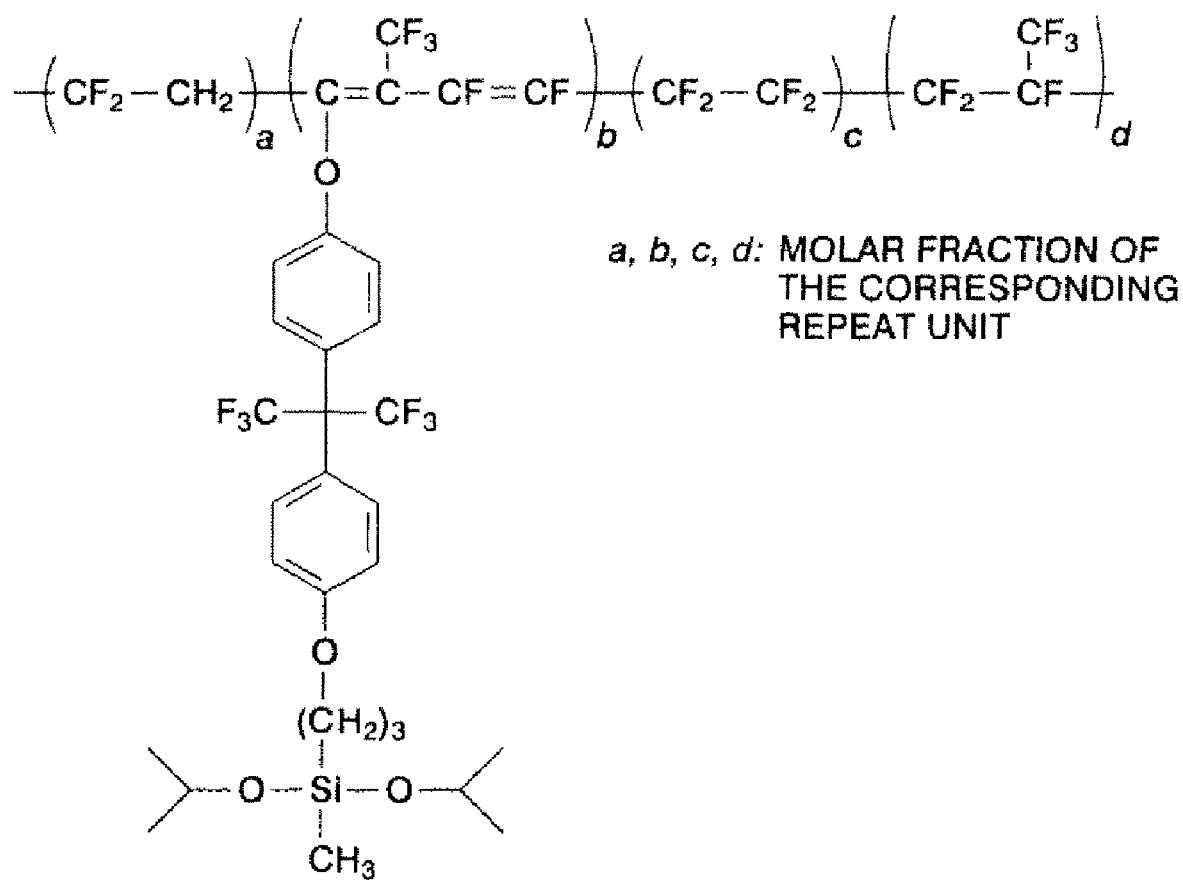
FIG. 6 is a proposed structure of an experimentally prepared silane functionalized fluoropolymer.

Elemental analysis of the siloxane-cured fluoroelastomer for carbon and hydrogen content (31.28% C, 1.28% H) suggests functionalization of the chain in approximately a functionalized diene/Viton® ratio of 1:15 and suggests a silane functionalize fluoropolymer having a structure similar to that shown in FIG. 6.

A thin film coating of the silane grafted fluoropolymer was cast on a biaxially-oriented polyethylene terephthalate (boPET) polyester film sold under the trade name MYLAR®, followed by curing at 150° C. for three hours. The cured film displayed excellent solvent resistance when rubbed with MIBK, indicating that crosslinking bonds had formed between the silane grafted fluoropolymer chains.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A composition of matter for coating a fuser roll, comprising:
    a plurality of fluoropolymer chains,
        wherein each of the fluoropolymer chains is chemically bonded to at least one organic graft;
        wherein the at least one organic graft comprises a phenoxy group, a linking group, and at least one end group;
        wherein the phenoxy group is chemically bonded to the fluoropolymer chain;
        wherein the linking group chemically bonds the phenoxy group with the at least one end group; and
        wherein the at least one end group comprises a silane bonded to a hydroxyl group or a silane bonded to a hydrolytic group selected from the group consisting of alkoxy, halide, carboxylate, and mixtures thereof.

2. The composition of matter of claim 1, wherein each of the plurality of fluoropolymer chains comprises a monomeric repeat unit that is selected from the group consisting of vinylidene fluoride, hexafluoropropylene, tetrafluoroethylene, perfluoro(methyl vinyl ether), and mixtures thereof.

3. The composition of matter of claim 1, wherein the linking group is selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

4. The composition of matter of claim 1 that is substantially free of metal oxide particles.

5. The composition of matter of claim 1, wherein substantially all of the silane end groups are condensed into a plurality of siloxane crosslinking groups.

6. A fluoroelastomer composition, comprising:
    a network of fluoropolymer chains; and
    a plurality of organic grafts;
        wherein each of the plurality of organic grafts comprises a reactive end group, a linking group, and at least one end group;
        wherein the reactive end group is chemically bonded to one of the fluoropolymer chains of the network;
        wherein the linking group chemically bonds the reactive end group with the at least one end group;
        wherein the at least one end group comprises a silane bonded to a hydroxyl group or a silane bonded to a hydrolytic group selected from the group consisting of alkoxy, halide, carboxylate, and mixtures thereof; and
        wherein substantially all of the end groups are condensed into a plurality of siloxane crosslinking groups.

7. The fluoroelastomer of claim 6, wherein the fluoropolymer chains comprise a monomeric repeat unit that is selected from the group consisting of vinylidene fluoride, hexafluoropropylene, tetrafluoroethylene, perfluoro(methyl vinyl ether), and mixtures thereof.

8. The fluoroelastomer of claim 6, wherein the reactive end group is selected from the group consisting of phenol, amine, and mixtures thereof.

9. The fluoroelastomer composition of claim 6, wherein the linking group is selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

10. The fluoroelastomer composition of claim 6, wherein the organic graft is represented by a formula comprising:

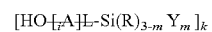

in which A is an aromatic group or a fluorinated aromatic group having from about 6 to about 30 carbons, L is a divalent linkage group, R is a hydrogen atom, an alkyl group or an aryl group, Y is a hydroxyl group or a hydrolytic group selected from the group consisting of alkoxy, halide, carboxylate, and mixtures thereof, m is an integer of from 1 to 3, and i and k are each an integer independently selected from 1 to about 5.

11. The fluoroelastomer composition of claim 10, wherein A is selected from the group consisting of:
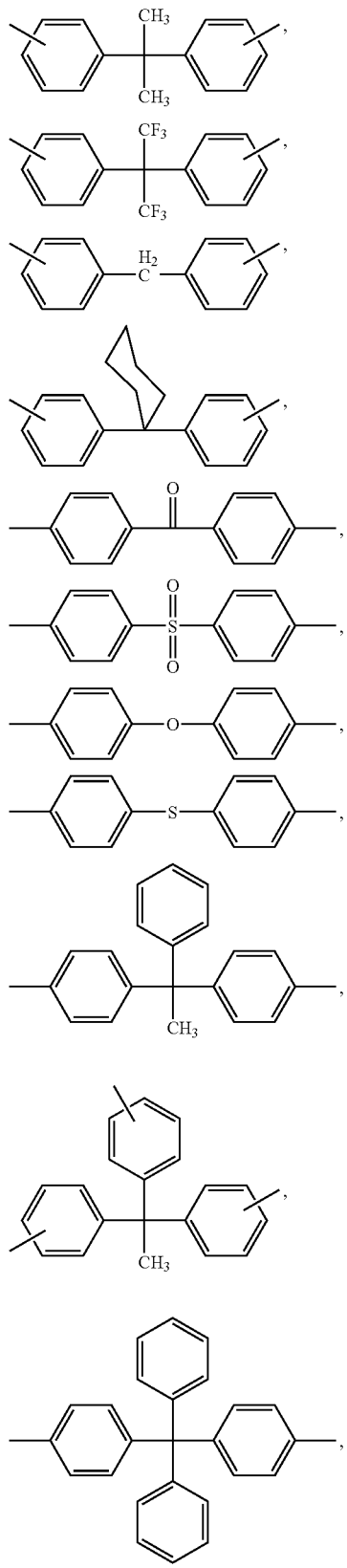
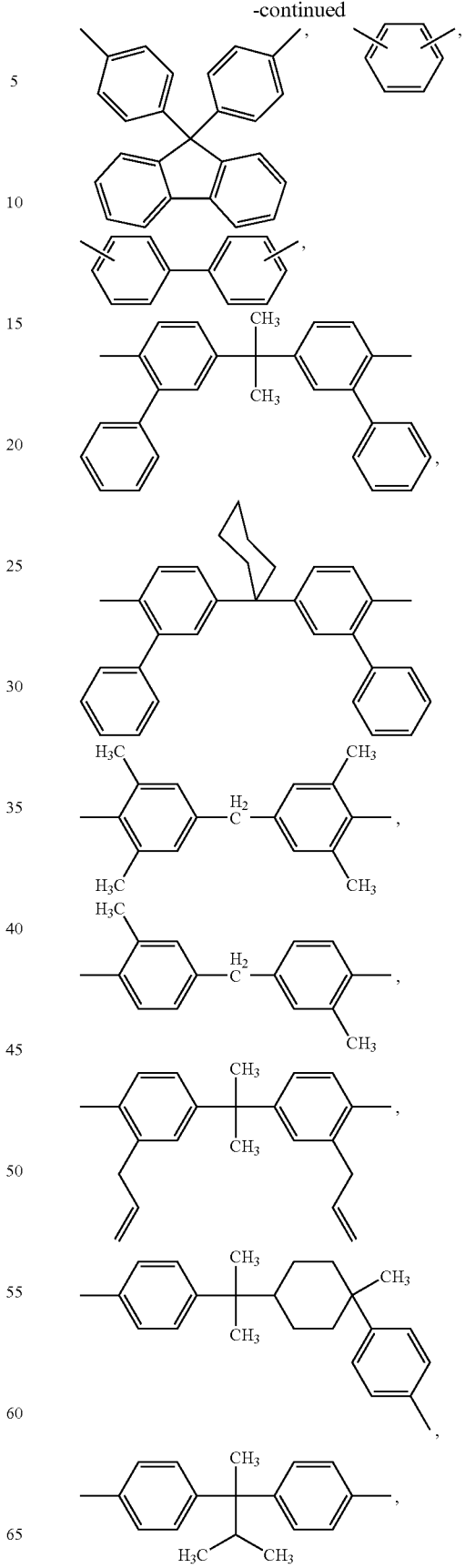

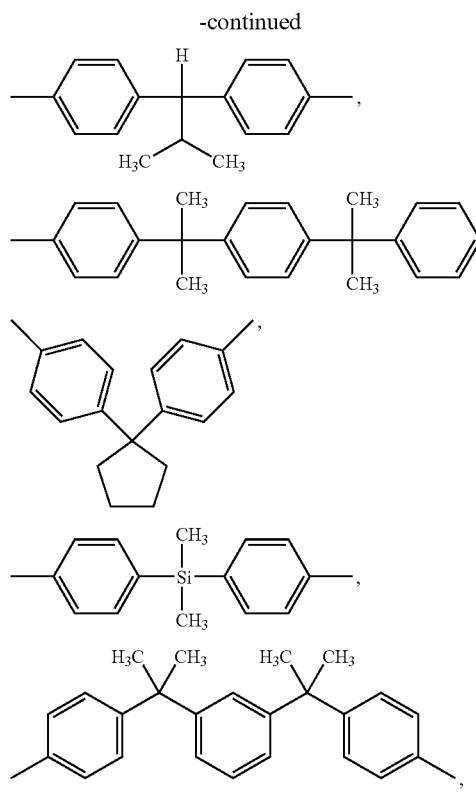

and the fluorinated derivatives thereof.

12. The fluoroelastomer composition of claim 10, wherein L is selected from the groups consisting of:

wherein y is an integer of from 1 to about 10;

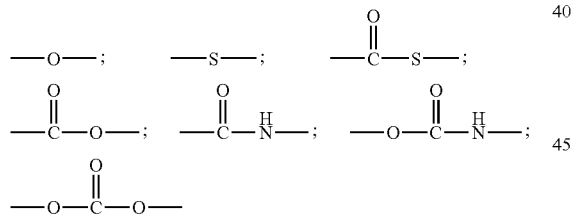

and combinations thereof.

13. The fluoroelastomer composition of claim 11, wherein the organic graft is selected from the group consisting of:

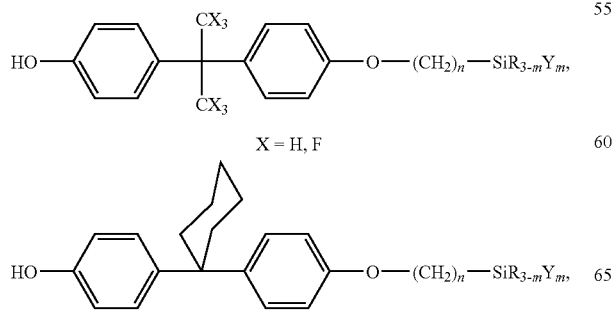

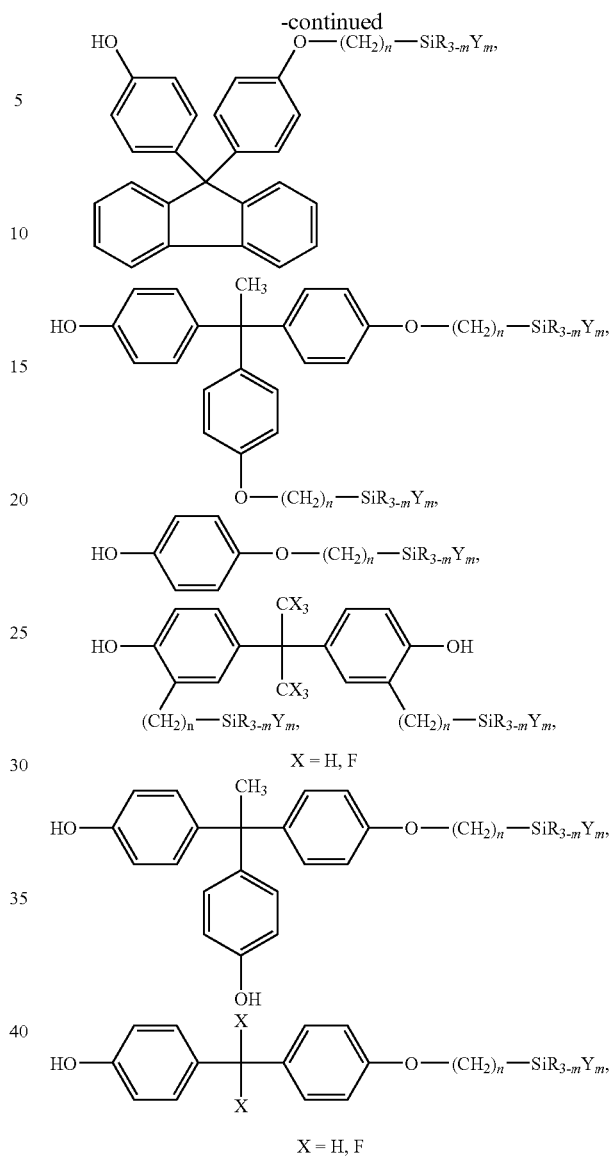

and the fluorinated derivatives thereof, wherein R is a hydrocarbyl group having from 1 to about 15 carbons, Y is selected from the group consisting of hydroxyl, alkoxy, halide, carboxylate, and mixtures thereof, n is an integer of from 1 to about 12, and m is an integer of from 1 to 3.

14. A coated fuser member, comprising
a fuser member; and
a fluoroelastomer coating on the fuser member; wherein the fluoroelastomer coating comprises:
a network of fluoropolymer chains; and
a plurality of organic grafts;
wherein each of the plurality of organic grafts comprises a reactive end group, a linking group, and at least one end group;
wherein the reactive end group is chemically bonded to one of the fluoropolymer chains of the network;
wherein the linking group chemically bonds the reactive end group with the at least one end group;
wherein the at least one end group comprises a silane bonded to a hydroxyl group or a silane bonded to a hydrolytic group selected from the group consisting of alkoxy, halide, carboxylate, and mixtures thereof; and wherein substantially all of the end groups are condensed into a plurality of siloxane crosslinking groups.

15. The coated fuser member of claim 14, wherein the fluoropolymer chains comprise a monomeric repeat unit that is selected from the group consisting of vinylidene fluoride, hexafluoropropylene, tetrafluoroethylene, perfluoro(methyl vinyl ether), and mixtures thereof.

16. The coated fuser member of claim 14, wherein the reactive end group is selected from the group consisting of phenol, amine, and mixtures thereof.

17. The coated fuser member of claim 14, wherein the linking group is selected from the group consisting of a linear aromatic hydrocarbon group having from about 6 to about 60 carbons, a linear aromatic fluorocarbon group having from about 6 to about 60 carbons, a branched aromatic hydrocarbon group having from about 6 to about 60 carbons, a branched aromatic fluorocarbon group having from about 6 to about 60 carbons, a linear aliphatic hydrocarbon group having from about 1 to about 30 carbons, a linear aliphatic fluorocarbon group having from about 1 to about 30 carbons, a branched aliphatic hydrocarbon group having from about 1 to about 30 carbons, a branched aliphatic fluorocarbon group having from about 1 to about 30 carbons, a heteroatom, and mixtures thereof.

18. The coated fuser member of claim 15, wherein the fuser member further comprises a material that is selected from the group consisting of a polymer, a metal, a metal oxide, and a ceramic.

* * * * *